(12) United States Patent
Asao

(10) Patent No.: US 6,525,443 B2
(45) Date of Patent: Feb. 25, 2003

(54) DYNAMO-ELECTRIC MACHINE

(75) Inventor: Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/768,555

(22) Filed: Jan. 25, 2001

(65) Prior Publication Data

US 2002/0030417 A1 Mar. 14, 2002

(30) Foreign Application Priority Data

Jul. 27, 2000 (JP) ........................................ 2000-226843

(51) Int. Cl.[7] .............................. H02K 3/00; H02K 3/04
(52) U.S. Cl. ...................... 310/201; 310/180; 310/184
(58) Field of Search ................................ 310/263, 201, 310/179, 184, 185, 180, 198, 195

(56) References Cited

U.S. PATENT DOCUMENTS

| | | | |
|---|---|---|---|
| 1,826,295 A | 10/1931 | Apple | |
| 3,453,468 A | 7/1969 | Lund | |
| 3,914,860 A | 10/1975 | Schuler | |
| 5,714,824 A | 2/1998 | Couture et al. | |
| 6,049,154 A | * 4/2000 | Asao et al. | .................... 29/256 |
| 6,208,058 B1 | * 3/2001 | Taji et al. | .................... 310/108 |
| 6,268,678 B1 | * 7/2001 | Asao et al. | ................. 310/180 |

FOREIGN PATENT DOCUMENTS

| | | | |
|---|---|---|---|
| EP | 0 881 742 | 12/1998 | |
| JP | 11-164504 | 6/1999 | ............ H02K/3/24 |
| JP | 2000-69700 | 3/2000 | ............ H02K/3/28 |

OTHER PUBLICATIONS

Patent Abstracts of Japan, vol. 1999, No. 11, Sep. 30, 1999.
Patent Abstracts of Japan, vol. 1999, No. 08, Jun. 30, 1999.

* cited by examiner

*Primary Examiner*—Burton S. Mullins
(74) *Attorney, Agent, or Firm*—Sughrue Mion, PLLC

(57) ABSTRACT

A dynamo-electric machine is provided in which the height of coil ends in the axial direction may be reduced. The coil ends comprise first extending portions 30b extending diagonally from slots 15a of a stator core 15, end portions 30a formed by the turn portions 30a which are bent and continuous with the first extending portions 30b and second extending portions 30c continuous with the turn portions 30a and leading to other slots 15a, each first and second extending portion 30b, 30c twisted around a respective extending direction axis and overlapping adjacent other first and second extending portions 30b, 30c in a radial direction.

12 Claims, 18 Drawing Sheets

FIG. 5
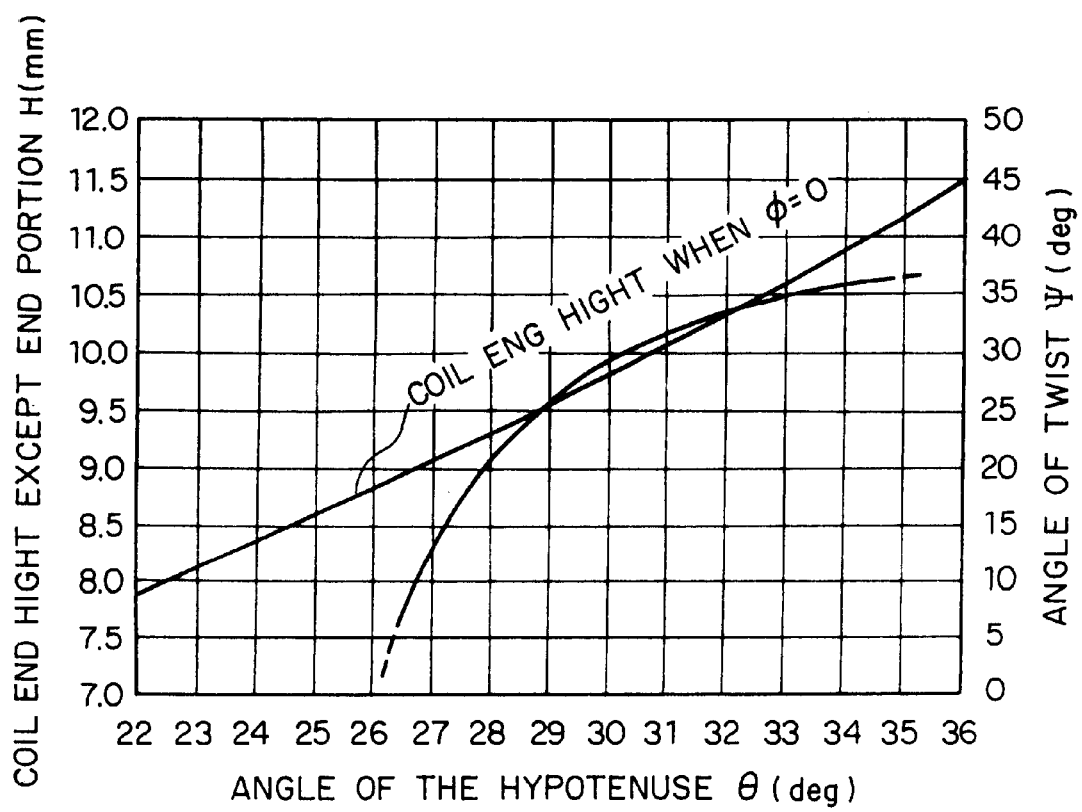
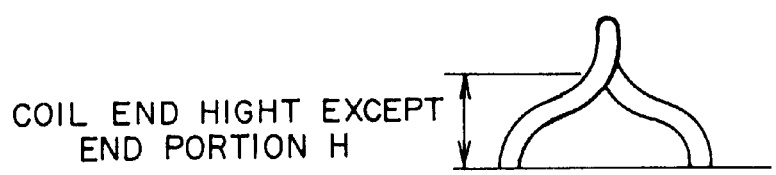

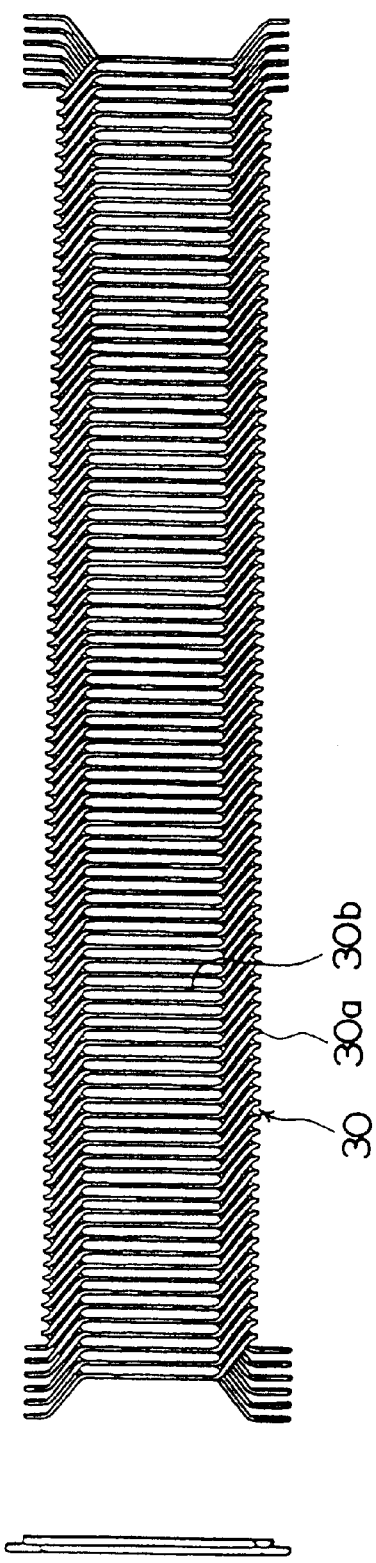

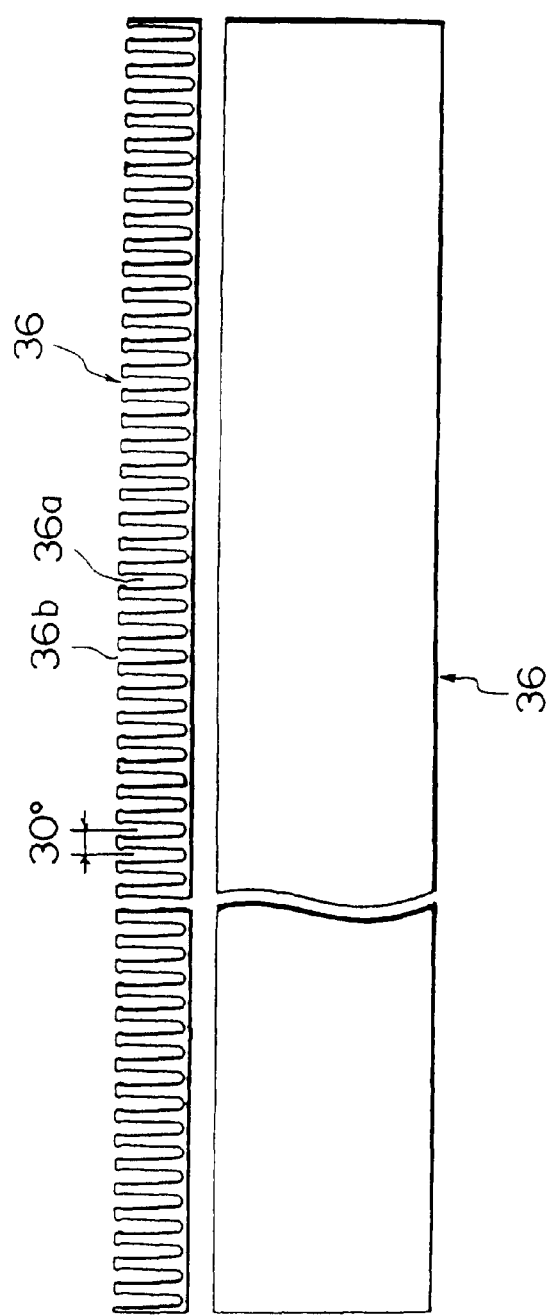

DYNAMO-ELECTRIC MACHINE

BACKGROUND OF THE INVENTION

1. Field of the Invention

The present invention relates to a dynamo-electric machine such as a generator, and in particular, relates to a dynamo-electric machine wherein a coil end height of a stator may be reduced and which may be reduced in size.

2. Description of the Related Art

Generally, cooling ventilation is supplied to coil ends (bridge portions outside a stator core are called coil ends) of a stator—which are heat producing portions—in order to realize compact high output in a dynamo-electric machine such as a generator and the like. In order to suppress wind noise due to ventilation at this location, it is necessary to reduce the size of the coils ends which are a ventilation drag. Hence, it is necessary to improve the space factor of electric conductors housed in the magnetic circuit of the stator and to line up and increase the density of bridge portions, i.e. coil ends, of the stator winding.

Constructions aimed at increasing the space factor of the electrical conductors using short conductor segments for the electrical conductors in the stator and at lining up and increasing the density of the coil ends have been proposed in Japanese Patent Application Laid-open No. Hei 11-164504, for example.

FIG. 21 is a side elevational view showing an enlarged portion of a coil end in a conventional dynamo-electric machine such as described in the above publication.

In FIG. 21, first extending portions 230b extending diagonally from slots 15a of a stator core 15 are drawn-out straight from the slots 15a of stator core 15. Also, turn portions 230a which are bent at respective locations and continuous with the first extending portions 230b are formed by bending relative to the first extending portions 230b. Furthermore, second extending portions 230c continuous with the turn portions 230a and leading to other slots are formed by bending relative to the turn portions 230a. The turn portions 230a are disposed so that surfaces including lateral surfaces thereof line up vertically with respect to end surfaces of the stator core 15. Constructing coil ends in this manner leads to stationary blade-type low noise at the turn portions 230a.

In a conventional dynamo-electric machine such as described above there are problems in that, since the coil ends have a high axial height, electrical resistance is high, output is degraded and copper loss is increased, also, generating efficiency and temperature conditions are degraded. Moreover, though it is expected that a conventional coil end shape will have a stationary blade-like function, this location becomes a ventilation resistance, pressure loss increases and noise worsens.

SUMMARY OF THE INVENTION

The present invention aims to solve the above problems with the conventional art and an object of the present invention is to provide a dynamo-electric machine in which the height of coil ends in the axial direction may be reduced, it is possible to reduce the size, coil electrical resistance is decreased and output is increased, copper loss in the coil is decreased and temperature may be lowered and efficiency increased, and also, pressure loss at coil ends formed in ventilation passages may be lowered and noise may be suppressed.

In order to achieve the above objects, according to one aspect of the present invention, there is provided a dynamo-electric machine including:
  a rotor including claw-shaped magnetic poles and fitted to a shaft;
  a stator including:
    a stator core disposed facing the rotor; and
    a stator winding, a cross-section thereof being a flattened-shape, installed in the stator core;
  a bracket supporting the rotor and the stator;
  the stator core formed with a number of slots extending axially at a predetermined pitch in a circumferential direction,
  the stator winding including a number of winding portions in which wire strands are wound so as to alternately occupy an inner layer and an outer layer in a slot depth direction within the slots at intervals of a predetermined number of slots, the wire strands folding back outside the slots at axial end surfaces of the stator core to form turn portions, and
  the turn portions aligning in a circumferential direction to constitute coil end groups;
  the coil ends including first extending portions extending diagonally from slots of the stator core, end portions formed by the turn portions being bent and continuous with the first extending portions, and second extending portions continuous with the turn portions and leading to other slots, each first and second extending portion being twisted around a respective extending direction axis and overlapping adjacent other first and second extending portions in a radial direction.

According to another aspect of the present invention, end portions formed by turn portions are inclined relative to a ray extending from a center of the stator core when viewed from an axial direction of the stator.

According to still another aspect of the present invention, end portions formed by turn portions are each inclined relative to the shaft when viewed from a radial direction.

According to still another aspect of the present invention, first and second extending portions are twisted as soon as they extend from the slots of the stator core.

According to still another aspect of the present invention, at least one portion of the first and second extending portions contacts adjacent other first and second extending portions.

According to still another aspect of the present invention, an outside diameter-side surface of the first extending portions of the stator winding forms an end-side surface as the turn portions and is bent around to form an inner diameter-side surface of the second extending portions.

According to still another aspect of the present invention, a cross-section of a coil of the first and second extending portions of the stator winding is thicker in a radial direction than in a circumferential direction.

According to yet another aspect of the present invention, a thickness of the coil end in a radial direction is approximately twice that of the wire strands of the first and second extending portions.

According to yet another aspect of the present invention, 2n strands of the wire strands are disposed in a row in the depth direction in each of the slots;
  and the turn portions of the wire strands are arranged so as to align into n rows in a circumferential direction.

According to yet another aspect of the present invention, cooling means for supplying cooling ventilation inside the bracket by rotation of the rotor is further provided,
  the coil ends being cooled by passage of the cooling ventilation inside the bracket.

According to yet another aspect of the present invention, the cooling ventilation passing through a ventilation passage is ventilated in a radial direction of the coil ends.

According to still yet another aspect of the present invention, the cooling means is a fan disposed at the rotor and the cooling ventilation is ventilated from an inner diameter-side of the coil ends to an outer diameter-side thereof.

BRIEF DESCRIPTION OF THE DRAWINGS

FIG. 5 is a graph showing a relationship between an angle of the hypotenuse θ, an angle of twist Ψ and a coil end height.

FIGS. 10A and 10B are a side elevational view and a plan view, respectively, showing an inner-layer wire-strand group constituting part of the stator winding used in the automotive alternator.

FIG. 15A and 15B are a side elevational view and a rear elevation, respectively, explaining the construction of the stator core.

DETAILED DESCRIPTION OF THE PREFERRED EMBODIMENTS

The preferred embodiments of the present invention will now be explained with reference to the drawings.

Embodiment 1

Figure 1:
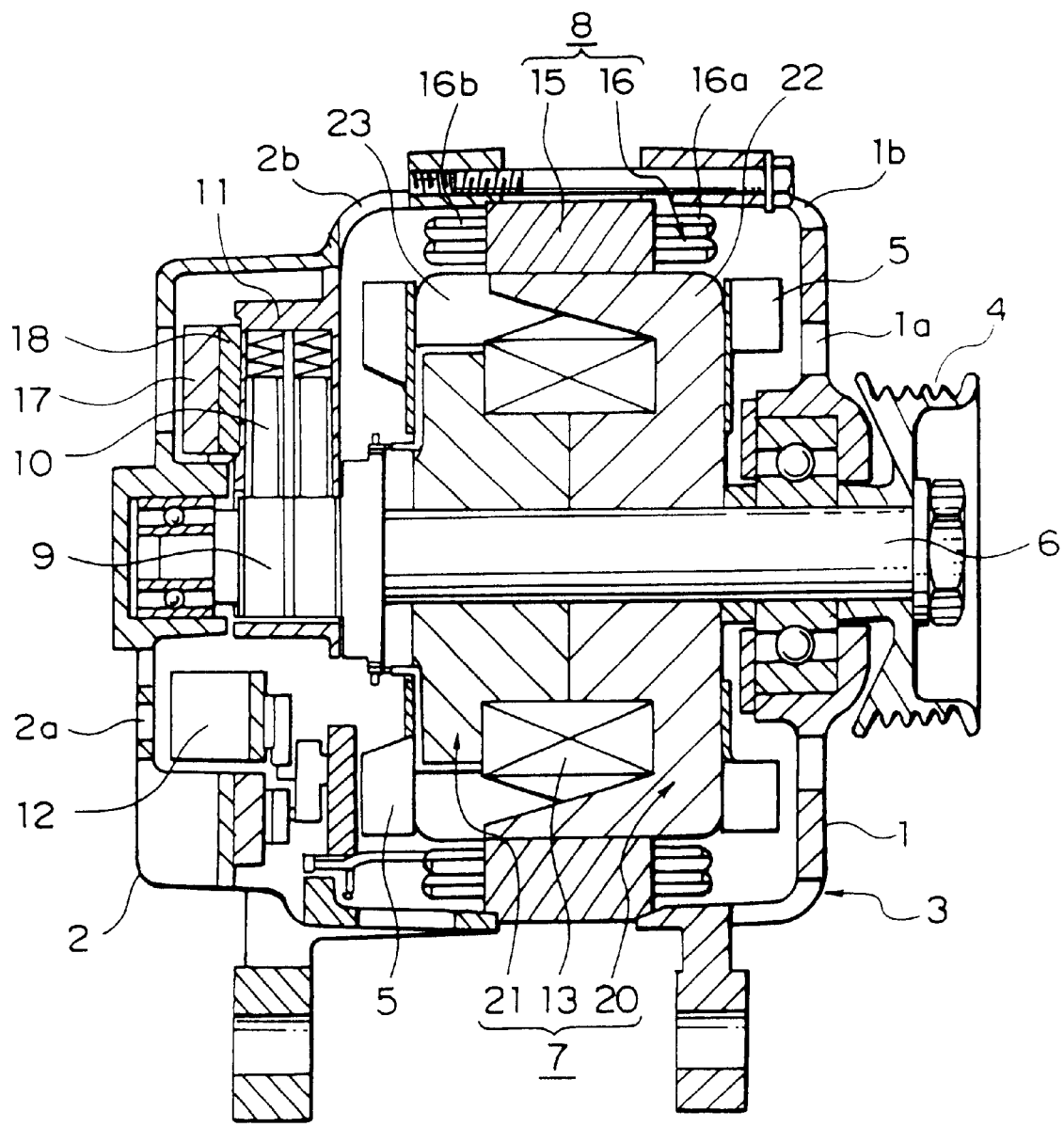
FIG. 1 is a cross section showing a construction of an automotive alternator according to Embodiment 1 of the present invention.
Figure 2:
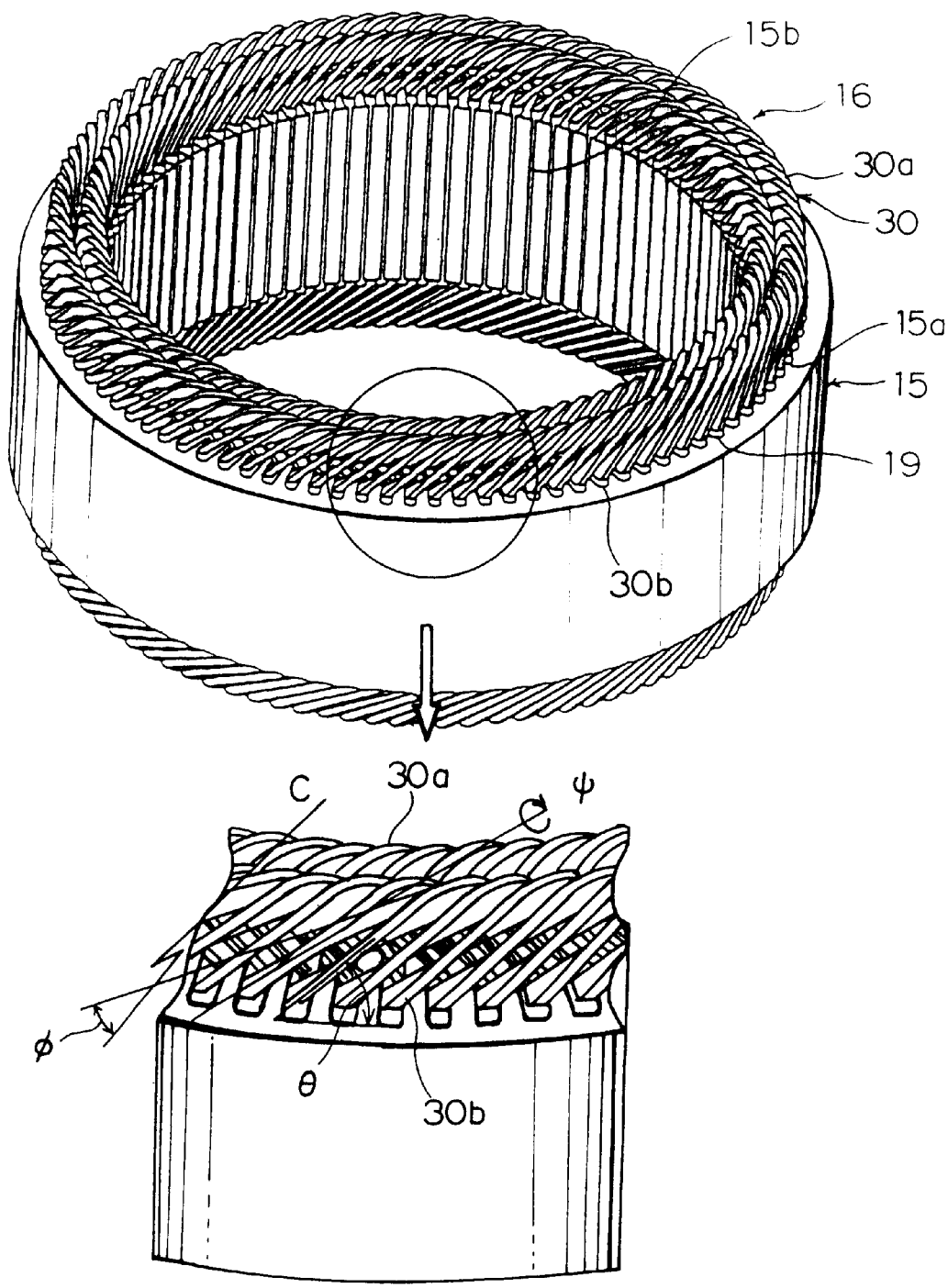
FIG. 2 is a perspective view showing a stator of the automotive alternator and an enlarged portion of a coil end thereof.
Figure 3:
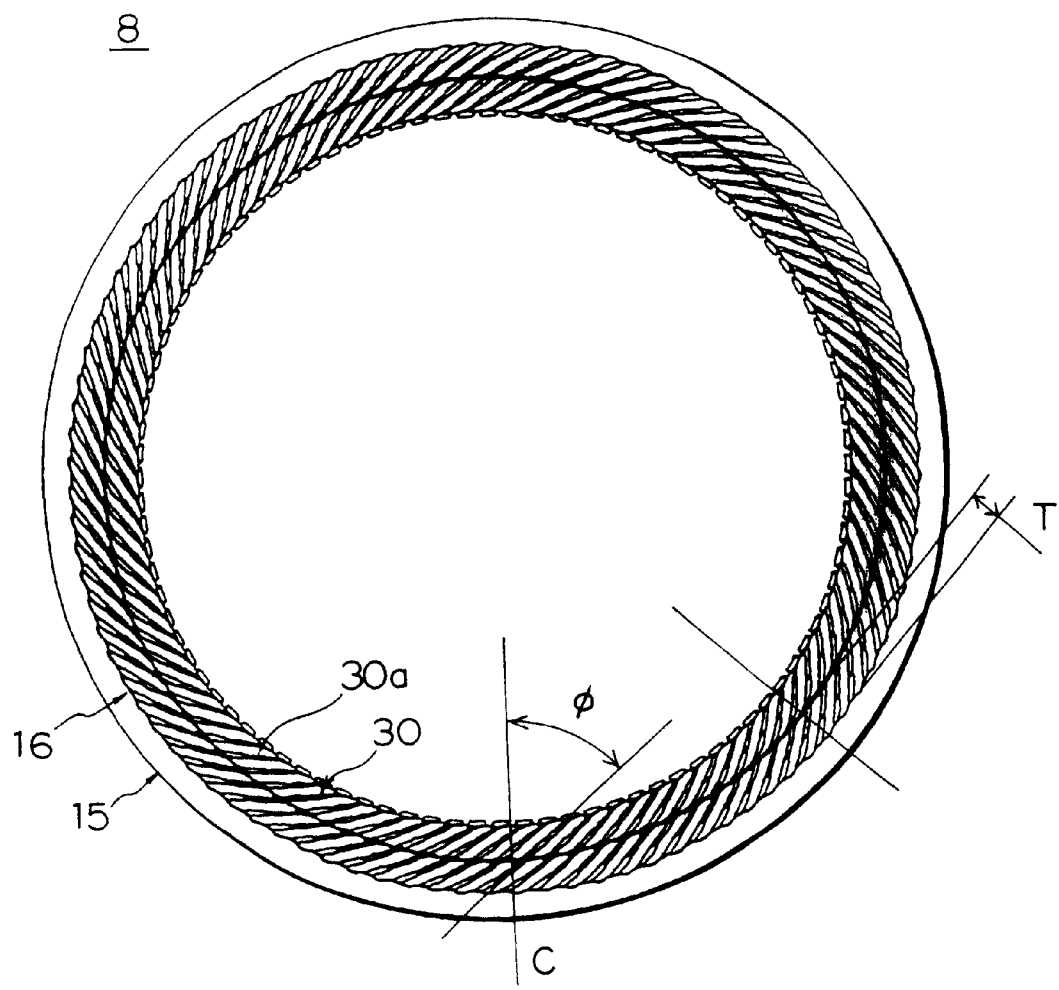
FIG. 3 is a front view showing a stator of the automotive alternator.
Figure 4:
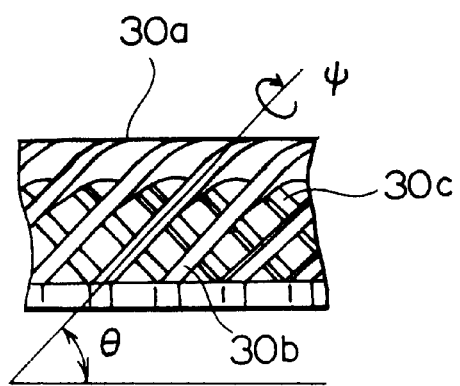
FIG. 4 is a side elevational view showing an enlarged portion of a coil end of the automotive alternator.
Figure 6:
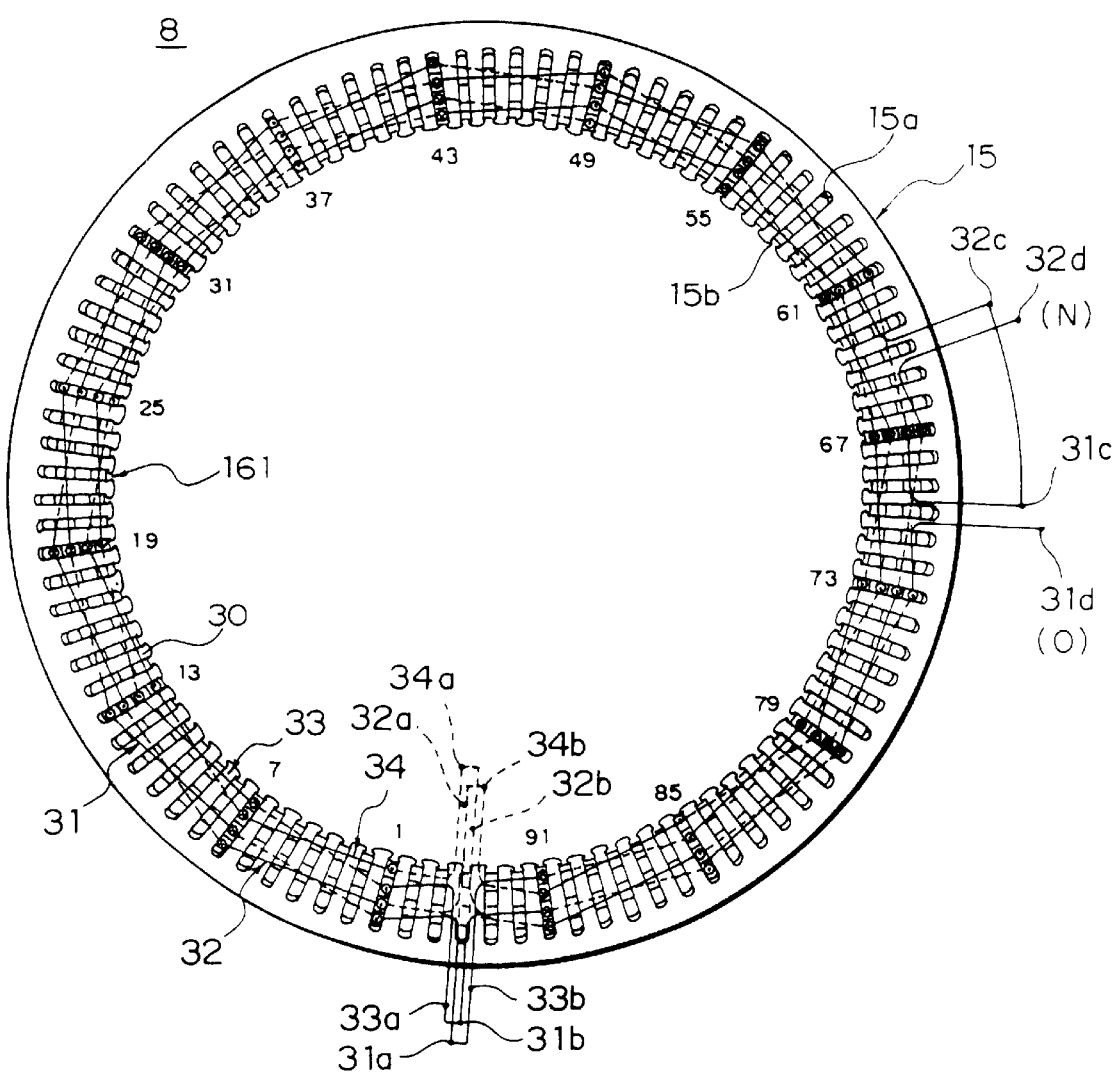
FIG. 6, is a plan view explaining connections in one phase of a stator winding in the automotive alternator.
Figure 7:
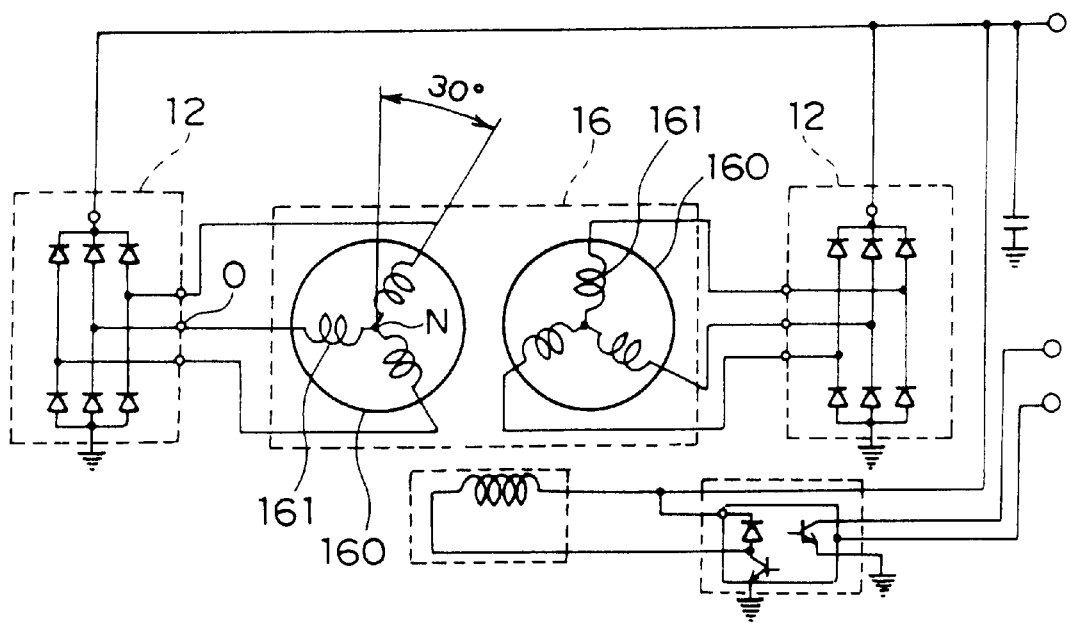
FIG. 7 is a circuit diagram of the automotive alternator.
Figure 8:
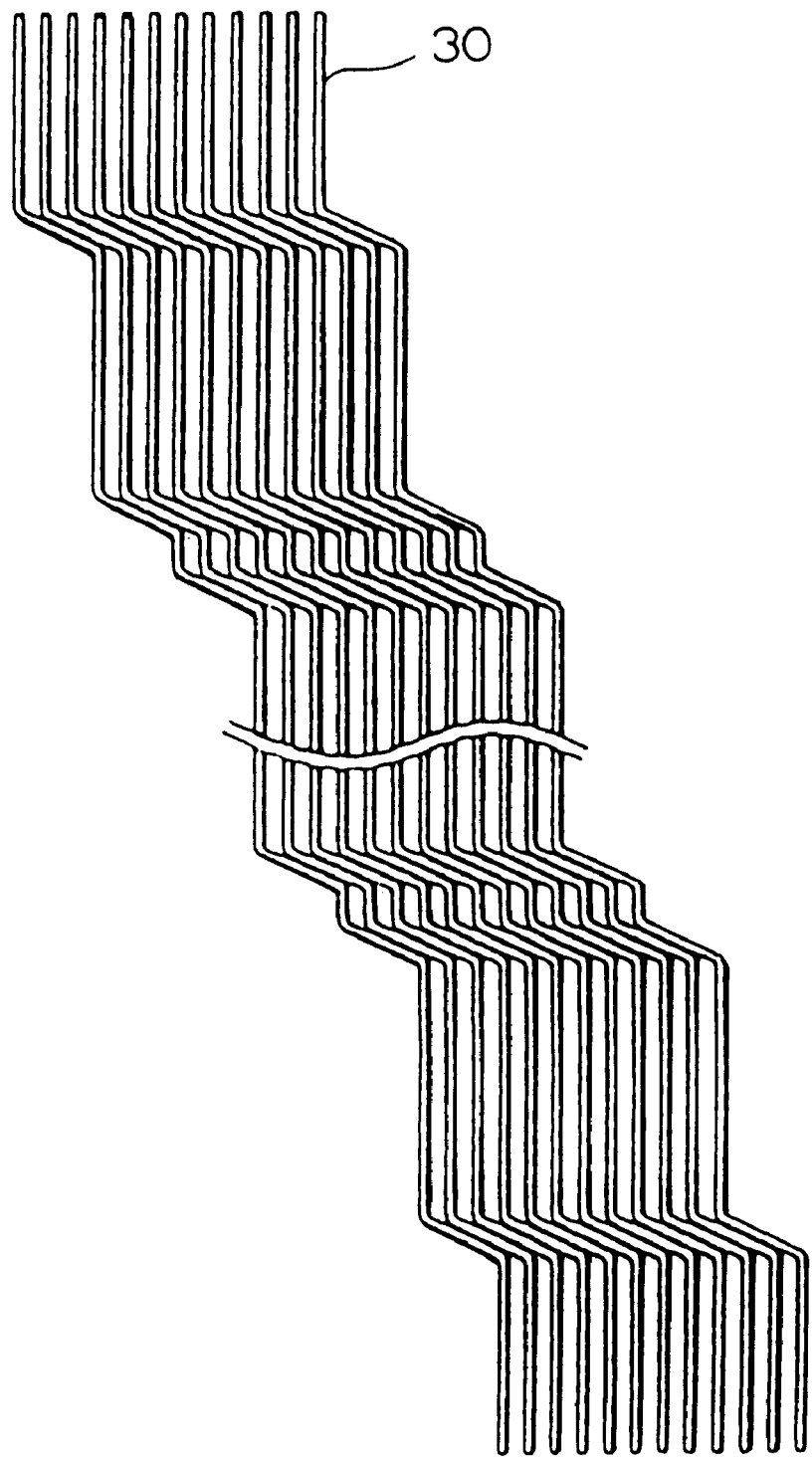
FIG. 8 is an explanatory diagram showing a manufacturing process for winding groups constituting part of the stator winding used in the automotive alternator.
Figure 9:
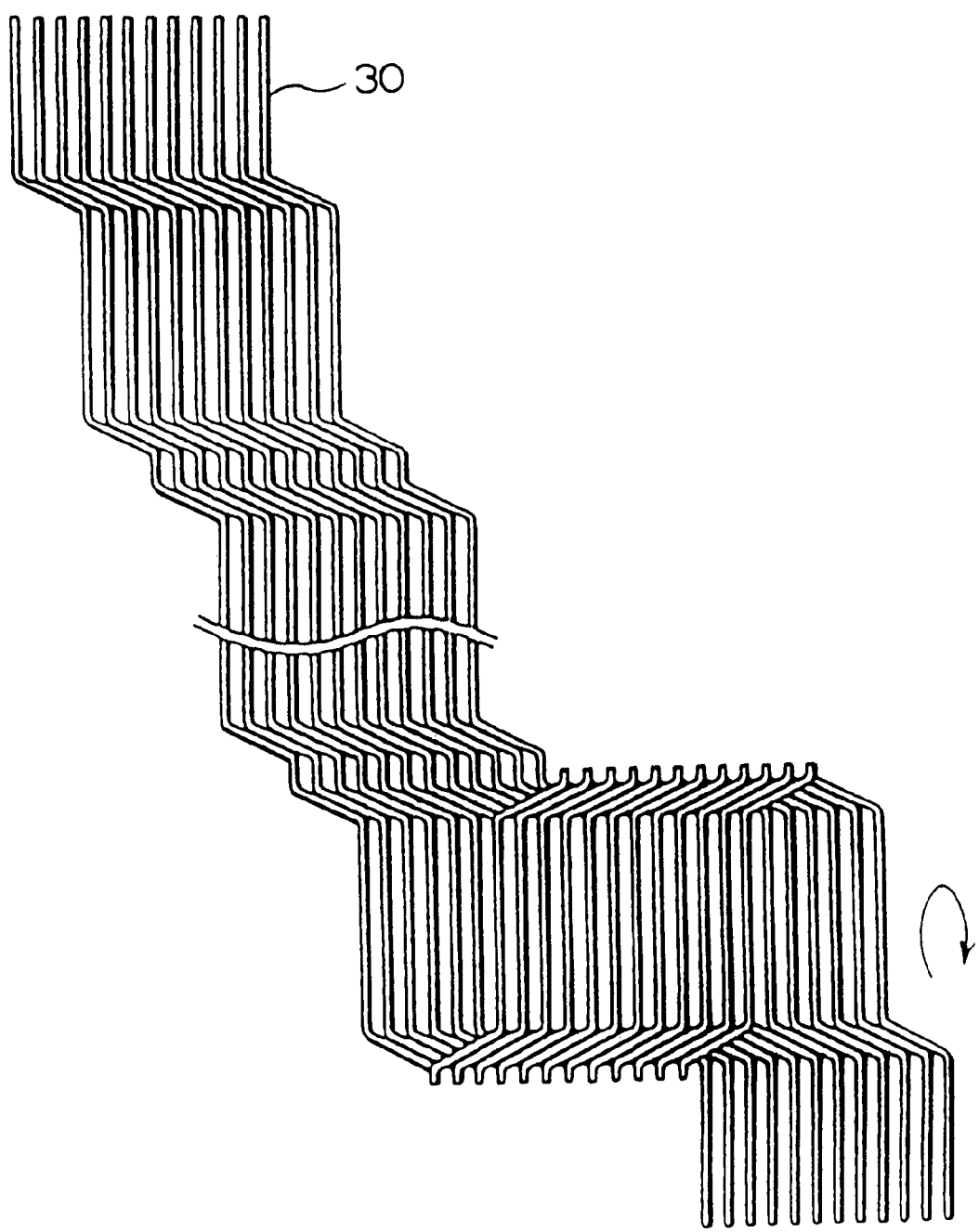
FIG. 9 is an explanatory diagram showing a manufacturing process for winding groups constituting part of the stator winding used in the automotive alternator.
Figures 11A, 11B:
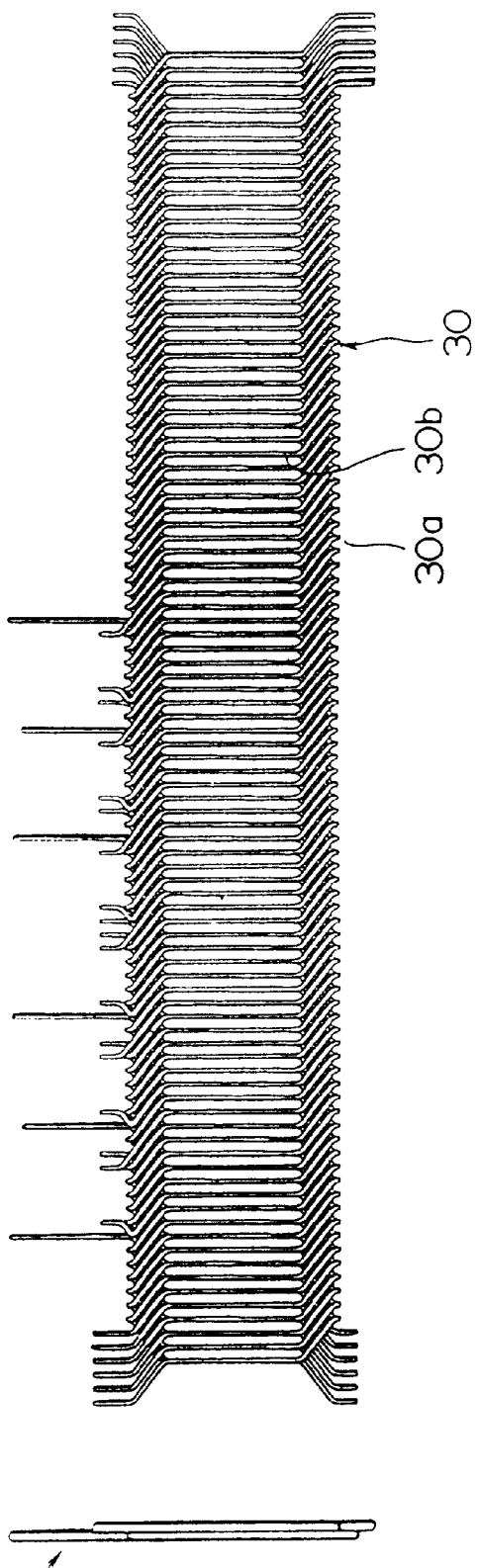
FIG. 11A and 11B are a side elevational view and a plan view, respectively, showing an outer-layer wire-strand group constituting part of the stator winding used in the automotive alternator.
Figure 12:
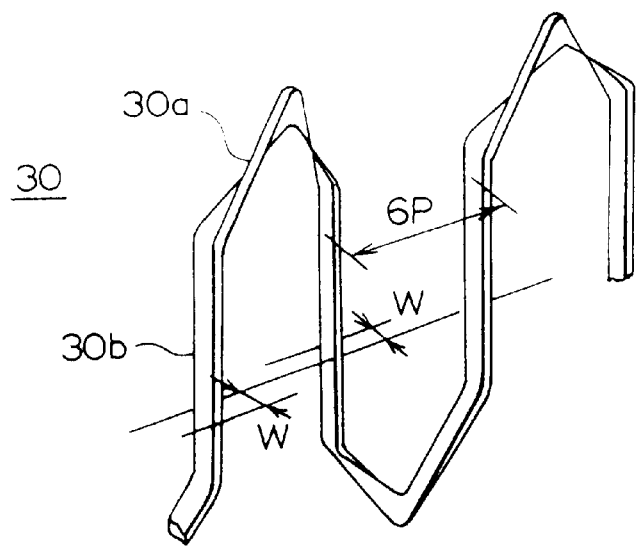
FIG. 12 is a perspective view showing an essential portion of a wire strand constituting a portion of the stator winding used in the automotive alternator.
Figure 13:
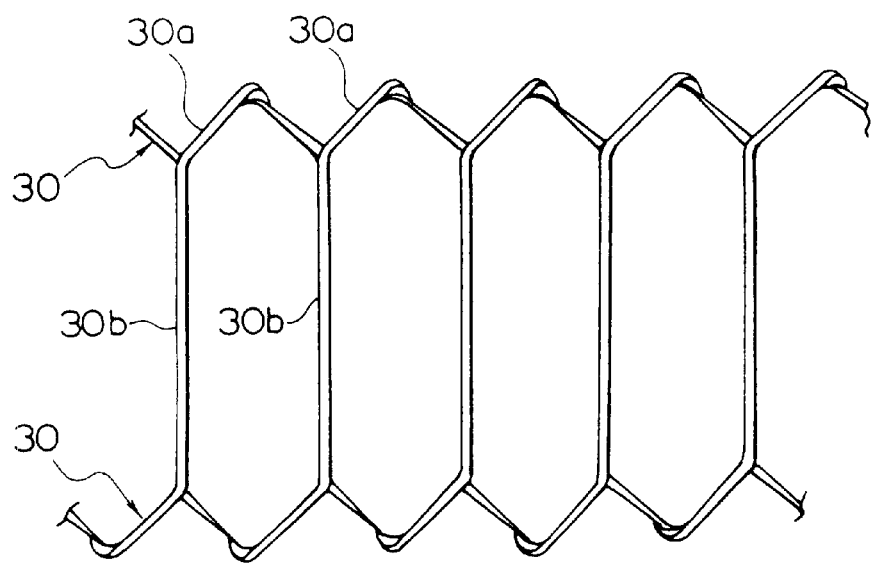
FIG. 13 is an explanatory diagram showing arrangement of the wire strands constituting a portion of the stator winding used in the automotive alternator.
Figure 16A:
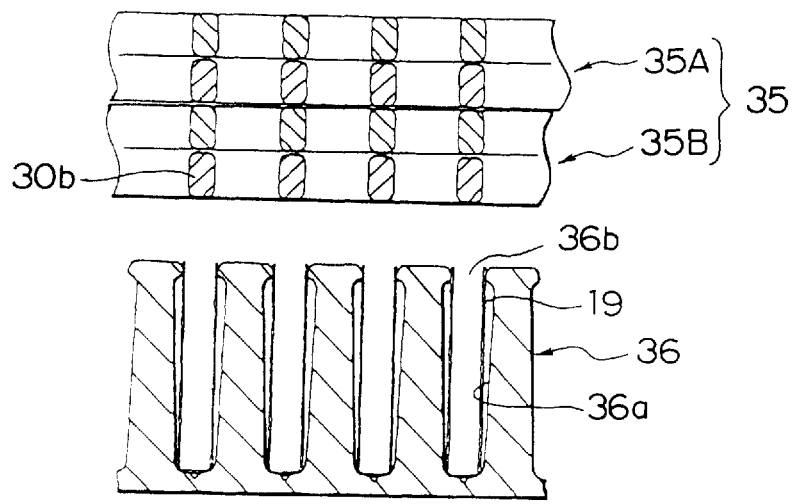
FIG. 16A to 16C are cross sections explaining the manufacturing process for the stator used in this automotive alternator.
Figure 16B:
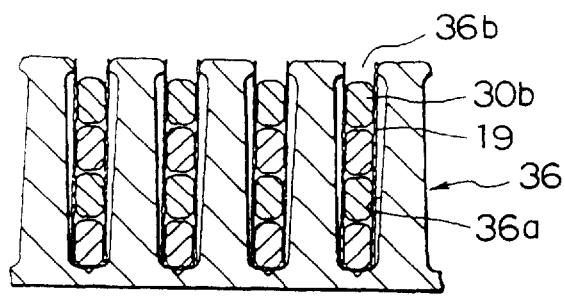
Figure 16C:
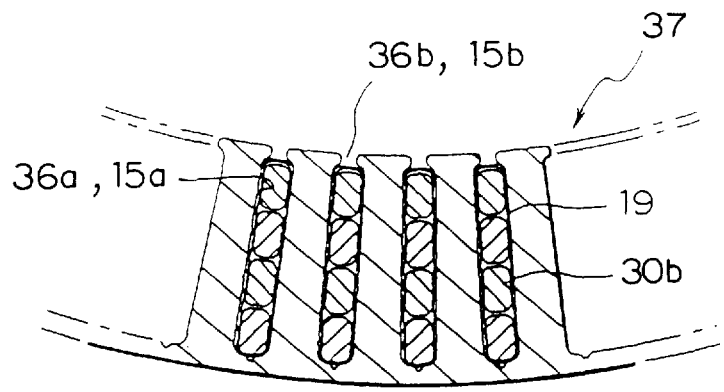
Figure 17:
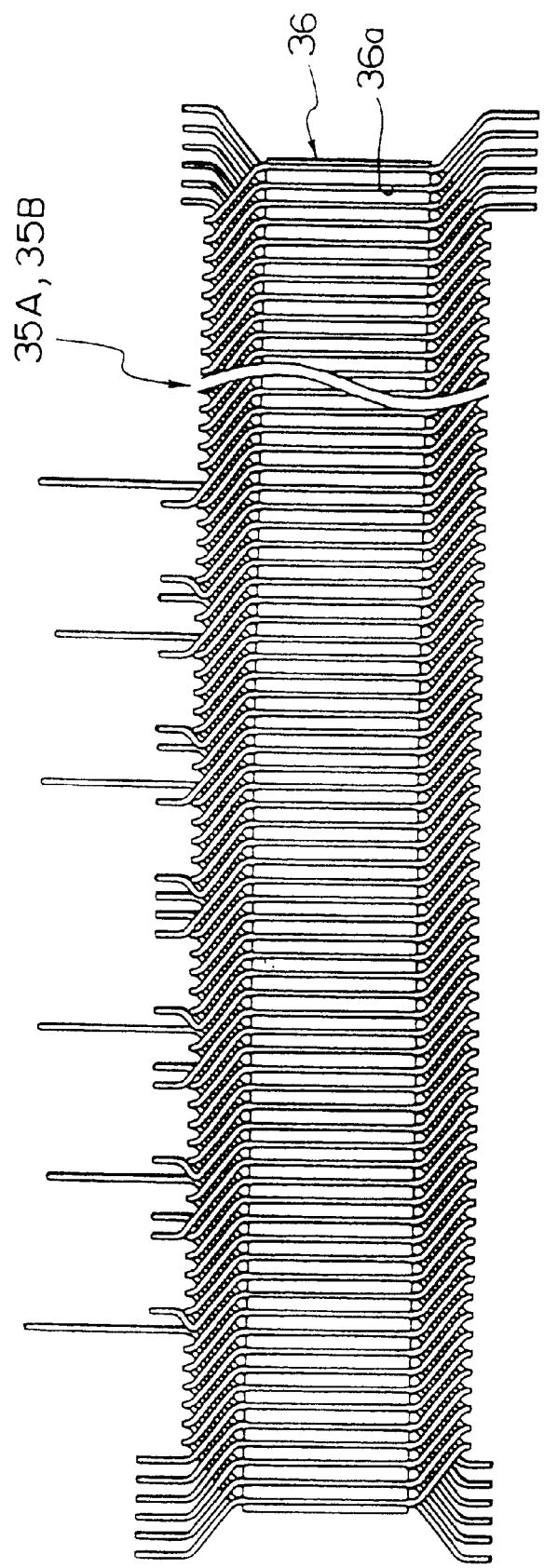
FIG. 17 is a plan showing a wire-strand group constituting part of the stator winding used in this automotive alternator mounted into the core.
Figure 18:
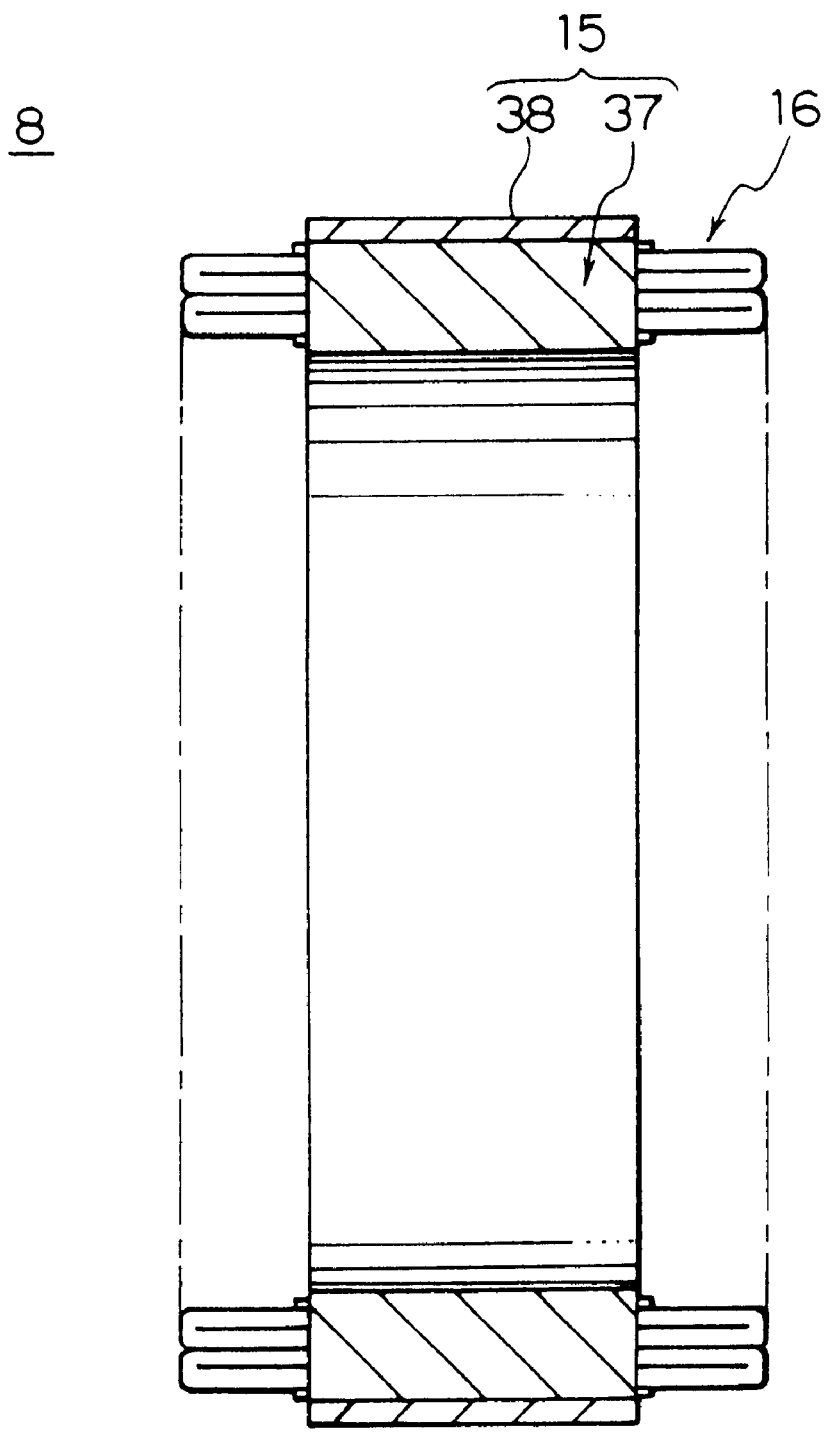
FIG. 18 is a cross section explaining the manufacturing process for the stator used in the automotive alternator.

FIG. 1 is a cross section showing a construction of an automotive alternator according to Embodiment 1 of the present invention, FIG. 2 is a perspective view showing a stator of the automotive alternator and an enlarged portion of a coil end thereof, FIG. 3 is a front view showing a stator of the automotive alternator, FIG. 4 is a side elevational view showing an enlarged portion of a coil end of the automotive alternator FIG. 5 is a graph showing a relationship between an angle of the hypotenuse θ, an angle of twist ψ and a coil end height, FIG. 6 is a plan view explaining connections in one phase of a stator winding in the automotive alternator, FIG. 7 is a circuit diagram of the automotive alternator, FIGS. 8 and 9 are explanatory diagrams showing a manufacturing process for winding groups constituting part of the stator winding used in the automotive alternator, FIG. 10A and 10B are a side elevational view and a plan view, respectively, showing an inner-layer wire-strand group constituting part of the stator winding used in the automotive alternator, FIG. 11A and 11B are a side elevational view and a plan view, respectively, showing an outer-layer wire-strand group constituting part of the stator winding used in the automotive alternator, FIG. 12 is a perspective view showing a portion of a wire strand constituting an essential portion of the stator winding used in the automotive alternator, FIG. 13 is an explanatory diagram showing arrangement of the wire strands constituting a portion of the stator winding used in the automotive alternator, FIG. 14 is an explanatory diagram showing another manufacturing process for winding groups, FIG. 15A and 11B are a side elevational view and a rear elevation, respectively, explaining the construction of the stator core, FIG. 16A to 16C are cross sections explaining the manufacturing process for the stator used in this automotive alternator, FIG. 17 is a plan showing a wire-strand group constituting part of the stator winding used in this automotive alternator mounted into the core, FIG. 18 is a cross section explaining the manufacturing process for the stator used in the automotive alternator. Moreover, lead wires and bridging connections have been omitted from FIG. 2.

In FIG. 1, an automotive alternator is constructed by mounting, so as to be capable of rotating, a Lundell-type rotor 7 inside a case 3 constructed from an aluminum front bracket 1 and an aluminum rear bracket 2 by means of a shaft 6, and supporting a stator 8 at an inner wall of the case 3 so as to cover an outer circumferential side of the rotor 7.

The shaft 6 is supported in the front bracket 1 and the rear bracket 2 so as to be capable of rotating. A pulley 4 is fastened to a first end of the shaft 6 so that rotational torque from an engine can be transmitted to the shaft 6 by means of a belt (not shown). Slip rings 9 for supplying electric current to the rotor 7 are fastened to a second end of the shaft 6, and a pair of brushes 10 are housed in a brush holder 11 disposed inside the case such that the pair of brushes 10 slide in contact with the slip rings 9. A regulator 18 for adjusting the magnitude of alternating voltage generated in the stator 8 is fastened to a heat sink 17 fitted onto the brush holder 11. Rectifiers 12 which are electrically connected to the stator 8 and convert alternating current generated in the stator 8 into direct current are mounted inside the case 3.

The rotor 7 is composed of a rotor coil 13 for generating magnetic flux upon flow of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each having eight claw-shaped magnetic poles 22 and 23 disposed on an outer circumferential perimeter at an even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Air intake vents 1a and 2a are disposed in axial end surfaces of the front bracket 1 and the rear bracket 2, and air discharge vents 1b and 2b are disposed in two outer circumferential shoulder portions of the front bracket 1 and the rear bracket 2, opposite the radial outside of the front-end and rear-end coil ends 16a and 16b of the stator winding 16.

As shown in FIG. 2 to 4, the stator 8 includes: a cylindrical stator core 15 composed of a laminated core formed with 1a number of slots 15a extending longitudinally at a predetermined pitch in a circumferential direction; a polyphase stator winding 16 wound onto the stator core 15; and insulators 19 installed in each of the slots 15a for electrically insulating the polyphase stator winding 16 from the stator core 15. The polyphase stator winding 16 includes a number of windings in each of which one wire strand 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six (96) slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the wire strands 30.

In examining one coil end constituting coil end groups 16a, 16b, the coil end includes, a first extending portion 30b extending diagonally from a slot 15a of the stator core 15, an end portion 30a—being the above mentioned turn portion 30a—curved at a portion which is continuous with the first extending portion 30b and a second extending portion 30c continuous with the end portion 30a and leading to another slot 15a.

In order to reduce the height of the coil end groups 16a, 16b in an axial direction, it is preferable that there is a small angle θ between the first extending portions 30b extending diagonally from an axial end surface of the stator core 15 and the axial end surface of the stator core 15. It is also preferable that the end portions be inclined with respect to the axial direction of the stator. Hence, in the present embodiment, the extending portions 30b are twisted by only an angle ψ around an axis of the extending direction to thereby make this angle θ smaller than in a conventional example. Furthermore, end portions 30a which are bent and continuous with the first extending portions 30b are inclined with respect to the axial direction of the stator because, as above, they are twisted by only the angle ψ around the axis of the extending direction, and are inclined by only an angle φ relative to a ray C extending from a center of the stator core 15. Still further, second extending portions 30c continuous with the end portions 30a are twisted by only the angle ψ around an axis of an extending direction opposite first extending portions 30b and are lead into other slots 15a.

Moreover, when the end portions are inclined a large degree with respect to the axial direction of the stator to reduce their height, there is excessive surface displacement at inner sides of turn portions thereof which causes an insulating coating to become damaged. Accordingly, it is necessary that, as above, the end portions be inclined by only the angle φ to prevent this as well. Also, the extending portions must be twisted by the angle ψ around the axis of the extending direction, as above, to smoothly bend the thus inclined end portions and the extending portions.

Furthermore, when the angle φ is increased it is also necessary to increase the angle ψ in order to maintain a predetermined clearance between adjacent end portions in the circumferential direction. Nevertheless, as shown in FIG. 5, since the coil end height of extending portions increases as the result of an increase in the angle φ, it is necessary to set appropriate values in order to maintain a predetermined clearance between extending portions of adjacent coils.

In the mode of the present embodiment the following are set: θ=32°, φ=60°, ψ=35°. Also, each coil end is made in exactly the same shape and there is a clearance of approximately 1 mm between extending portions of coils adjacent in the circumferential direction.

Moreover, first and second extending portions 30b, 30c are gradually twisted as soon as they extend from the slots 15a of the stator core 15. Also, outer diameter-side surfaces of first extending portions 30b form end-side surfaces (end surfaces in the axial direction) as the turn portions 30a and are bent back to form inner diameter-side surfaces of second extending portions 30c.

Furthermore, a coil cross-section of first land second extending portions 30b, 30c of the stator winding 16 is thicker in the radial direction than in the circumferential direction. Also, a radial direction thickness T of the coil end is approximately twice a radial thickness of the wire strand 30 of the first and second extending portions 30b, 30c.

In the present embodiment, since the coil end groups are formed in the above mentioned shape, the height (thereof) in the axial direction may be reduced, the coil insulating coating may be kept from being damaged, a predetermined interval is provided between each coil, short-circuiting and interference may be prevented between coils and cooling air is ventilated between coils to improve cooling performance.

Next, the winding construction of one phase of a stator winding group 161 will be explained in detail with reference to FIGS. 6 and 7.

One phase of the stator winding group 161 is composed of first to fourth winding sub-portions 31 to 34 each formed from one wire strand 30. The first winding sub-portion 31 is formed by wave winding one wire strand 30 into every sixth slot from slot numbers 1 to 91 so as to alternately occupy a first position from an outer circumferential side and a second position from the outer circumferential side inside the slots 15a. The second winding sub-portion 32 is formed by wave winding a wire strand 30 into every sixth slot from slot numbers 1 to 91 so as to alternately occupy the second position from the outer circumferential side and the first position from the outer circumferential side inside the slots 15a. The third winding sub-portion 33 is formed by wave winding a wire strand 30 into every sixth slot from slot numbers 1 to 91 so as to alternately occupy a third position from the outer circumferential side and a fourth position from the outer circumferential side inside the slots 15a. The fourth winding sub-portion 32 is formed by wave winding a wire strand 30 into every sixth slot from slot numbers 1 to 91 so as to alternately occupy the fourth position from the outer circumferential side and the third position from the outer circumferential side inside the slots 15a. The wire strands 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the wire strand 30 of the second winding sub-portion 32 extending outwards at the first end of the stator core 15 from slot numbers 61 and 67 is cut, and a portion of the wire strand 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of the stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, a second cut end 31d of the first winding sub-portion 31 and a second cut end 32d of the second winding sub-portion 32 become an lead wire (O) and a neutral-point lead wire (N), respectively.

Six phases of stator winding groups 161 are similarly formed by offsetting the slots 15a into which the wire strands 30 are wound one slot at a time. Then, as shown in FIG. 7, three phases each of the stator winding groups 161 are connected into star connections to form the two sets of three-phase stator winding portions 160, and each of the three-phase stator winding portions 160 is connected to a respective rectifier 12. The rectifiers 12 are connected in parallel so that the direct-current output from each is combined.

Here, the wire strands 30 constituting the first to fourth winding sub-portions 31 to 34 are each wound into a wave winding so as to extend out of first slots 15a at end surfaces of the stator core 15, fold back, and enter second slots 15a six slots away. Each of the wire strands 30 is also wound so as to alternately occupy the inner layer and the outer layer relative to the slot depth direction (the radial direction) in every sixth slot.

Turn portions 30a of the wire strands 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil-end portions 16a and 16b.

Next, assembly of the stator 8 will be explained with reference to FIGS. 8 to 20.

First, as shown in FIG. 8, twelve long wire strands 30 are simultaneously bent in the same plane to form a lightning-bolt shape. Then, a wire-strand group 35A, shown in FIG. 10, is prepared by progressively folding the strand at right angles, as indicated by the arrow in FIG. 9, using a jig. In addition, a wire-strand group 35B including bridging connections and lead wires, as shown in FIG. 11, is prepared in a similar manner. The wire-strand groups 35A and 35B are then annealed for ten minutes at 300° C. so that a parallel-epiped core 36 mounted with the wire-strand groups 35A and 35B can be easily formed into an annular shape.

Moreover, as shown in FIG. 12, each wire strand 30 is formed by bending it into a planar pattern in which straight portions 30b connected by turn portions 30a are lined up at a pitch of six slots (6P). Adjacent straight portions 30b are offset by a distance equal to one width (W) of the wire stands 30 by means of the turn portions 30a. The wire-strand groups 35A and 35B are constructed by arranging six wire-strand pairs so as to be offset by a pitch of one slot from each other, each wire-strand pair consisting of two wire strands 30 formed in the above pattern which are offset by a pitch of six slots and arranged such that straight portions 30b overlap as shown in FIG. 13. Six end portions of the wire strands 30 each extend outwards from first and second sides at first and second ends of the wire-strand groups 35A and 35B. Furthermore, the turn portions 30a are arranged so as to line up in rows ion first and second side portions of the wire-strand groups 35A and 35B Next, another method of manufacturing the wire-strand groups 35A, 35B will be explained.

Figure 14A:
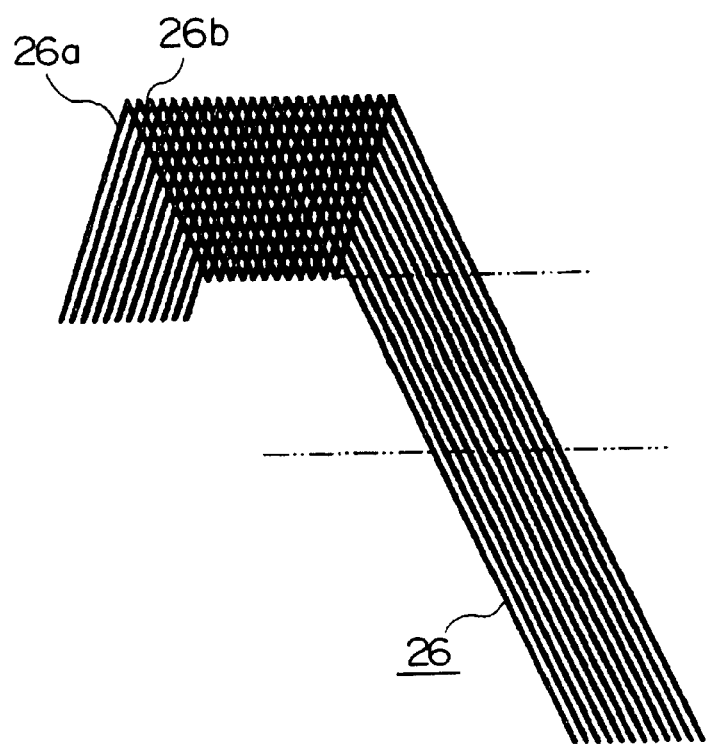
FIG. 14A & 14B is an explanatory diagram showing another manufacturing process for winding groups.

First, as shown in FIG. 14(A), a plurality of belt-shaped members 26 are successively bent around the perimeter of as plate-shaped core (not shown) at locations shown by two-dot dash lines in the drawing, and helical shapes are formed by winding a predetermined number of turns. After removing the core, regions 26a located at one side of helical belt-shaped members 26 are then pressed from the outside such that inner surfaces of these regions 26a and inner surfaces of regions 26b located at the other side of the helical shapes become the same surface.

Figure 14B:
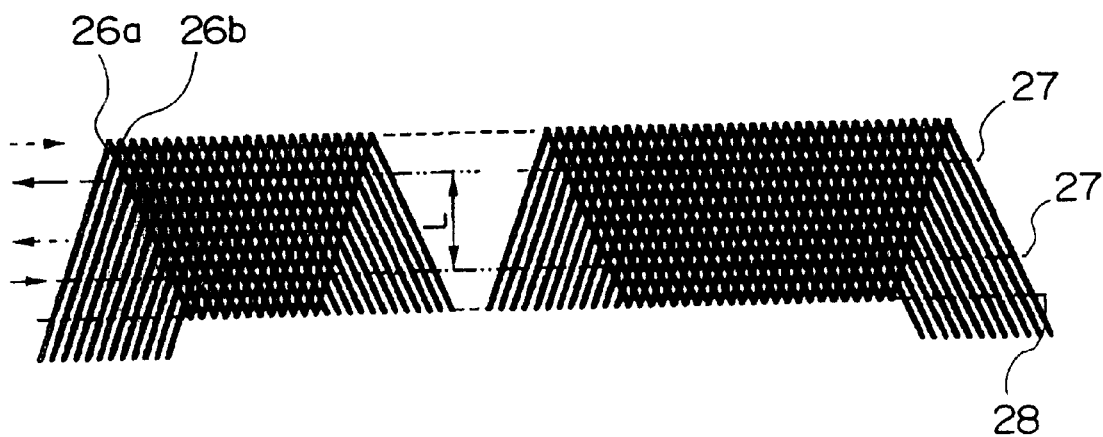

Next, as shown in FIG. 14(B), pins 27 are inserted from region 26a sides and region 26b-sides, respectively, at positions corresponding to a predetermined vertical interval L between respective regions 26a and respective regions 26b of the helical belt-shaped members 26. By moving the group of pins 27 inserted from the region 26a-side to a reciprocal side of an extending direction of each helical shape, as shown by the solid arrows in the drawing, and by moving the group of pins 27 inserted from the region 26b-side to a reciprocal side of an extending direction of each helical shape, as shown by the dashed line arrows in the drawing, the belt-shaped members 26 are deformed in respective moving directions at positions where they contact respective pins 27 of the regions 26a and 26b so that straight portions and turn portions connecting the straight portions are formed to form a turtle shell-shaped winding group. Moreover, when each pin group 27 is moved, positioning pins 28 inserted between end portions of belt-shaped members 26 are disposed so as to prevent the belt-shaped members 26 from becoming disunited.

According to this mode of the above embodiment: a plurality of the belt-shaped members 26 are simultaneously formed as helical shapes, the regions 26a located at one side of the helical belt-shaped members 26 are pressed from the outside such that the inner surfaces of these regions 26a and the inner surfaces of the regions 26b located at the other side of the helical shapes become the same surface, the pins 27 are inserted from the region 26a-sides and region 26b-sides, respectively, at positions corresponding to the predetermined vertical interval L between the respective regions 26a and respective regions 26b of the helical belt-shaped members 26; and since by moving the group of pins 27 in the directions shown by the arrows in FIG. 14(B) the belt-shaped members 26 are deformed in respective moving directions at positions where they contact respective pins 27 so that straight portions and turn portions connecting the straight portions are formed to form a turtle shell-shaped winding group, as in the above mentioned mode of Embodiment 1, the conventionally-required steps of inserting and joining a large number of conductor segments can be omitted thereby improving operability and making it possible to increase a capacity for mass-production. Also, the turn portions may be reduced in height because it is not necessity to use a clamp as a jig for joining thereby making it possible to reduce the size of the stator winding.

In the first mode of the above embodiment, it is difficult to set appropriate angles at the end portions because bent-back wire-strand groups are formed as end portions. In this mode of the present invention there is an advantage in that the shape of the end portions and extending portions may be easily optionally set by setting the angle, width and the like of the positioning pins 28.

The parallelepiped core 36 is prepared by laminating a predetermined number of sheets of SPCC material formed with trapezoidal slots 36a at a predetermined pitch (an electrical angle of 30°) and laser welding an outer portion thereof.

As shown in FIG. 16(A), the insulators 19 are mounted in the slots 36a of the parallelepiped core 36, and the straight portions of the two wire-strand groups 35A and 35B are inserted so as to stack up within each of the slots. In this manner, the two wire-strand groups 35A and 35B are installed in the parallelepiped core 36 as shown in FIG. 16(B). At this time, straight portions 30b of the wire strands 30 are housed in lines of four in a radial direction within the slots 36a and are electrically insulated from the parallelepiped core 36 by the insulators 19. The two wire-strand groups 35A and 35B are stacked one on top of the other when installed in the parallelepiped core 36 as shown in FIG. 17.

Next, the parallelepiped core 36 is rolled up and its ends abutted and welded to each other to obtain a cylindrical core 37, as shown in FIG. 16(C). By rolling up the parallelepiped core 36, the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the wire strands 30 are connected to each other based on the connections shown in FIG. 6 to form a stator winding groups 161. Thereafter, the cylindrical core 37 is inserted into a cylindrical outer core 38 composed of laminated SPCC material and integrated by shrink fitting to obtain the stator 8 shown in FIG. 18. The integrated body consisting of the cylindrical core 37 and the outer core 38 corresponds to the stator core 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles thereby. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being expelled to the outside through the air discharge vents 2b. At the same time, at the front end, external air is drawn in axially through the air intake vents 1a by rotation of the fans 5, and is then deflected centrifugally by the fans 5, cooling the front-end coil end group 16a of the polyphase stator winding 16 before being expelled to the outside through the air discharge vents 1b.

According to Embodiment 1, a rotor 7 includes claw-shaped magnetic poles 22, 23 and fitted to a shaft 6;
  a stator 8 includes:
    a stator core 15 disposed facing the rotor 7; and
    a stator winding 16 a cross-section thereof being a flattened-shape, installed in the stator core 15;
  a bracket 1,2 supports the rotor 7 and the stator 8;
  the stator core 15 is formed with a number of slots 15a extending axially at a predetermined pitch in a circumferential direction,
  the stator winding 16 includes a number of winding portions in which wire strands 30 are wound so as to alternately occupy an inner layer and an outer layer in a slot depth direction within the slots 15a at intervals of a predetermined number of slots, the wire strands 30 folding back outside the slots at axial end surfaces of the stator core 15 to form turn portions 30a, and
  the turn portions 30a are aligned in a circumferential direction to constitute coil end groups 16a, 16b;
  the coil ends include first extending portions 30b extending diagonally from slots 15a of the stator core 15, end portions 30a formed by the turn portions 30a which are bent and continuous with the first extending portions 30b and second extending portions 30c continuous with the turn portions 30a and leading to other slots 15a, each first and second extending portion twisted around a respective extending direction axis and overlapping adjacent other first and second extending portions 30b, 30c in a radial direction.

Normally, even if the height of the coil ends in the axial direction, being limited by the pitch of the slots 15a, is reduced until the extending portions of adjacent coil ends contact, the height from the extending portions to the tips of the turn portions is hardly reduced at all. However, in the dynamo-electric machine according to the mode(s) of the present embodiment, since extending portions 30b, 30c are twisted around axes of respective extending directions so as to overlap adjacent other extending portions 30b, 30c radially, the height in the axial direction and the size may be reduced. Copper loss in the coil is reduced while the temperature may be lowered and efficiency increased. Also, pressure loss at coil ends formed in ventilation passages may be reduced so that noise may also be suppressed.

Furthermore, end portions 30a formed by turn portions 30a are inclined relative to the ray C extending from the center of the stator core when viewed from the axial direction of the stator 8. Thus, extending portions 30b, 30c may further well overlap adjacent other extending portions 30b, 30c and the height of the coil ends in the axial direction may be further reduced.

Moreover, end portions 30a formed by turn portions 30a are each inclined relative to the shaft when viewed from the radial direction. Thus, the height of the coil ends in the axial direction may be further reduced.

Also, the extending portions 30b, 30c are twisted as soon as they extend from the slots 15a of the stator core 15. Hence, adjacent extending portions 30b, 30c may be further well overlapped and the height of the coil ends in the axial direction may be further reduced.

Furthermore, outer diameter-side surfaces of first extending portions 30b form end-side surfaces as the turn portions 30a and are bent back to form inner diameter-side surfaces of second extending portions 30c. Hence, since the outer and inner diameter-side surfaces of the winding 16 are twisted to form end-side surfaces as the turn portions 30a, the height of the coil ends in the axial direction may be further reduced.

Moreover, the coil cross-section of first and second extending portions 30b, 30c of the stator winding 16 is thicker in the radial direction than in the circumferential direction. Thus, the winding is thin in the circumferential direction, i.e., the winding direction, and forming the shape of the coil ends in the present invention is thus facilitated.

Furthermore, the thickness of the coil ends in the radial direction is approximately twice that of the wire strand 30 of the first and second extending portions 30b, 30c in the radial direction. Hence the stator coil 16 may be realized with the smallest possible diameter.

Also, 2n strands of said wire strands 30 are disposed in a row in the depth direction in each of the slots 15a and the turn portions 30a of said wire strands are arranged so as to align into n rows in the circumferential direction. Thus, the thickness of the coil ends in the radial direction may be reduced, and the coil ends are not larger than the stator in the radial direction and the size may be reduced, even when the coil ends are lined up in a plurality of circumferential directions.

Moreover, cooling means (fans 5) for supplying cooling ventilation inside the bracket 1, 2 by rotation of the rotor 7 is further provided and the coil ends are cooled by passage of the cooling ventilation inside the bracket 1,2. Thus, since the size of the coil ends is reduced and there is little copper loss, sufficient cooling air is ventilated at the coil ends, little heat is generated and the reliability of the dynamo-electric machine may be improved.

Also, cooling air ventilating in the cooling passages travels in the radial direction of the coil ends. Thus, sufficient cooling air is ventilated at the coil ends.

Further, cooling means is the centrifugal fan 5 disposed at the rotor 7 and cooling ventilation is supplied from the inner diameter-side of the coil ends to an outer diameter-side thereof. Thus, the coil ends may cooled with high cooling efficiency from the inner diameter-side by the centrifugal fan 5.

Moreover, although extending portions of a mode of the present embodiment are twisted as soon as they extend from the stator core, they need not necessarily be formed in this manner. Extending portions may also simply extend without being twisted as they extend from the stator core and they may be twisted at respective locations in the vicinity of the turn portions.

Figure 19:
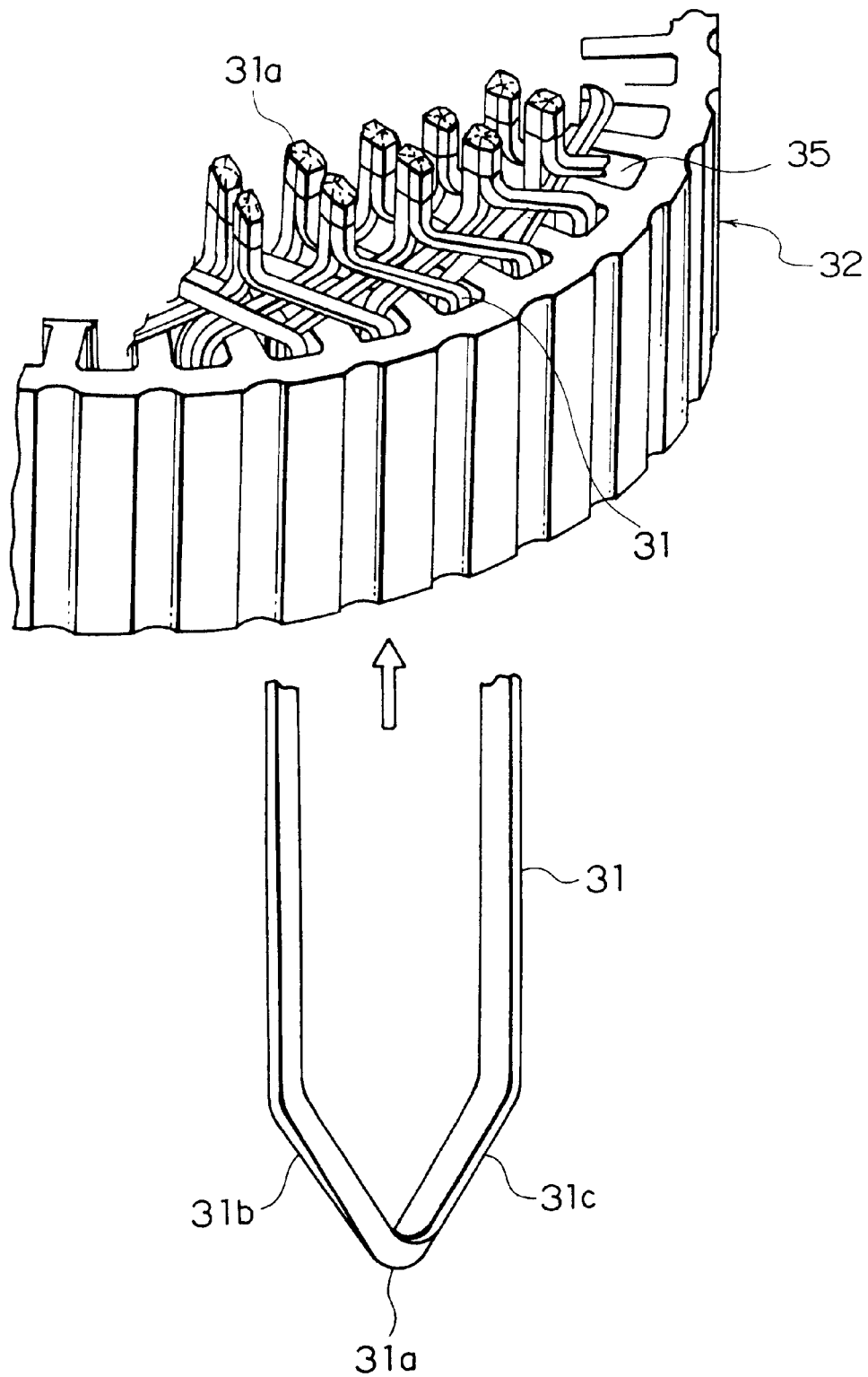
FIG. 19 is a perspective view showing a stator of another construction.

Further, in a mode of the present invention, although the stator winding 16 includes a number of winding portions in which long wire strands 30 are wound so as to alternately occupy an inner layer and an outer layer in a slot depth direction within slots 35 at intervals of a predetermined number of slots 35, as described above. It is not limited thereto. Namely, as shown in FIG. 19, a plurality of short, approximately U-shaped coil pieces 31 may be inserted from an axial end-side of a stator core 32, and the coil pieces 31 protruding from a axial end of the stator core 32 may be connected at a predetermined interval of coil pieces to form a continuous circuit.

With the above approximately U-shaped coil pieces 31, the same effects,can be obtained as when the coil ends constitute long wire strands 30 folding back outside the slots 35 and including first extending portions 31b extending diagonally from slots 35 of the stator core 32, end portions 31a formed by turn portions which are bent and continuous with the first extending portions 31b and second extending portions 31c continuous with the turn portions 30a and leading to other slots 35.

Compared to the coil where a plurality of short, approximately U-shaped coil pieces 31 are inserted from an axial end-side of the stator core 32 and the coil pieces 31 protruding from a axial end of the stator core 32 are connected, with the stator winding 16 including a number of winding portions in which long wire strands 30 are wound so as to alternately occupy an inner layer and an outer layer in a slot depth direction within slots 35 at intervals of a predetermined number of slots 35, a capacity for production is increased, and it is possible to suppress vibration in the stator 8 because rigidity is high in the coil without welds.

Embodiment 2

Figure 20:
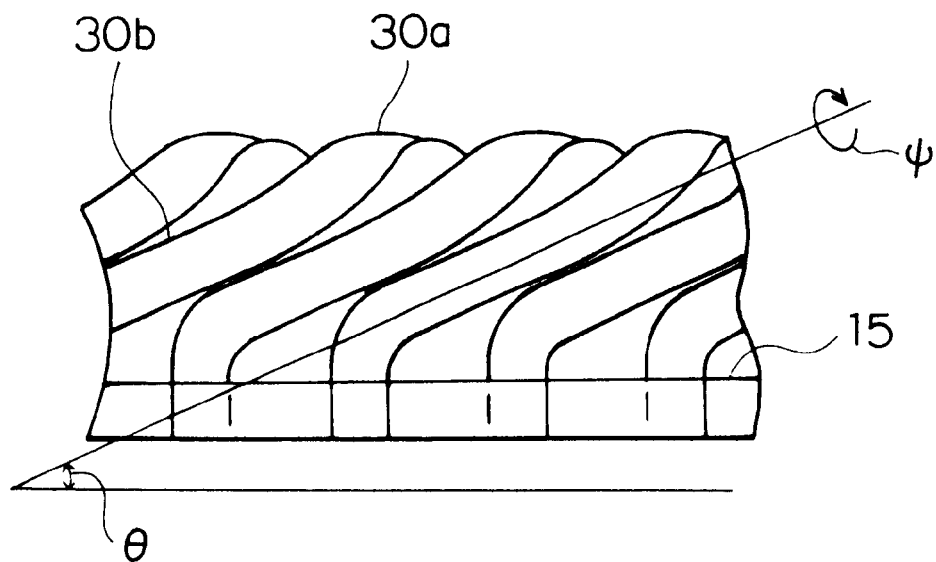
FIG. 20 is a side elevational view showing an enlarged portion of a coil end of an automotive alternator according to Embodiment 2 of the present invention.
Figure 21:
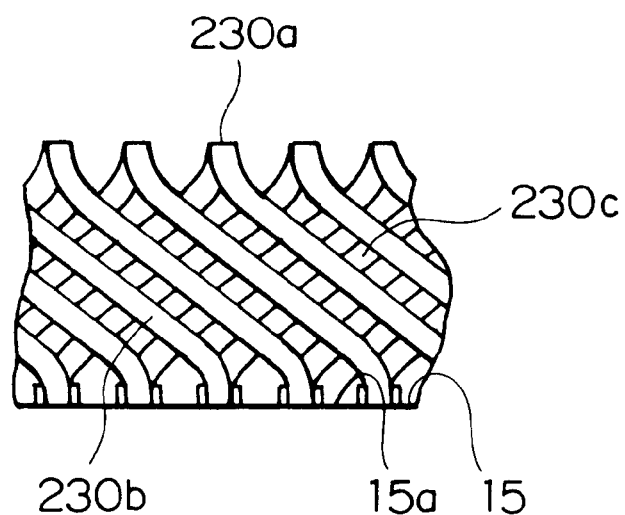
FIG. 21 is a side elevational view showing an enlarged portion of a coil end of a conventional automotive alternator

FIG. 20 is a side elevational view showing an enlarged portion of a coil end of an automotive alternator according to Embodiment 2 of the present invention. In a mode of the present embodiment, as in Embodiment 1, the, extending portions 30b are twisted by only an angle $\psi$ around an axis of an extending direction to thereby make an angle $\theta$ smaller than in a conventional example. Furthermore, end portions 30a bent and continuous with the first extending portions 30b are inclined by only an angle $\phi$ (not shown) relative to a ray (not shown) extending from a center of stator core 15. Still further, second extending portions 30c continuous with the end portions 30a are twisted by only the angle $\psi$ around an axis of an extending direction opposite first extending portions 30b and are lead into other slots 15a.

In a mode of the present embodiment the following are set: $\theta=27°$, $\phi=60°$, $\psi=20°$. Also, each coil end is made in exactly the same shape and such that side surfaces of the first extending portions 30b contact one another.

In a mode of the present embodiment, height in the axial direction is set as low as possible by making the coil end groups 16a, 16b in the above mentioned shape. Hence, with the mode of the present embodiment the amount of wire strands may be reduced and it is possible to suppress heat generated due to copper loss in the coil. Although cooling air does not ventilate between coil ends, ventilating resistance due to the coil ends is lowered so that the amount of air increases and the cooling performance of the coil ends is improved. In addition, it is also possible to control the temperature of built-in cooling components in a generator The present invention is constructed in the above manner and exhibits the effects described below.

According to the present invention there is provided a dynamo-electric machine including:

a rotor including claw-shaped magnetic poles and fitted to a shaft;

a stator including:
 a stator core disposed facing the rotor; and
 a stator winding, a cross-section thereof being a flattened-shape, installed in the stator core;

a bracket supporting the rotor and the stator;

the stator core formed with a number of slots extending axially at a predetermined pitch in a circumferential direction, the stator winding including a number of winding portions in which wire strands are wound so as to alternately occupy an inner layer and an outer layer in a slot depth direction within the slots at intervals of a predetermined number of slots the wire strands folding back outside the slots at axial end surfaces of the stator core to form turn portions, and the turn portions aligning in a circumferential direction to constitute coil end groups.

the coil ends including first extending portions extending diagonally from slots of the stator core, end portions formed by the turn portions which are bent and continuous with the first extending portions and second extending portions continuous with the turn portions and leading to other slots, each first and second extending portion twisted around a respective extending direction axis and overlapping adjacent other first and second extending portions in a radial direction. Generally, even if the height of the coil ends in the axial direction, being limited by the pitch of the slots, is reduced until the extending portions of adjacent coil ends contact, the height from the extending portions to the tips of the turn portions is hardly reduced at all. However, in the dynamo-electric machine according to present invention, since extending portions are twisted around axes of respective extending directions so as to overlap adjacent other extending portions in radial directions, the height in the axial direction and the size may be reduced. Copper loss in the coil is reduced while the temperature may be lowered and efficiency increased. Also, pressure loss at coil ends formed in ventilation passages may be reduced so that noise may also be suppressed.

Furthermore, end portions formed by turn portions are inclined relative to a ray extending from the center of the stator core when viewed from the axial direction of the stator. Thus, extending portions may further well overlap adjacent other extending portions and the height of the coil ends in the axial direction may be further reduced.

Moreover, end portions formed by turn portions are each inclined relative to the shaft when viewed from the radial direction. Thus, the height of the coil ends in the axial direction may be further reduced.

Also, the extending portions are twisted as soon as they extend from the slots of the stator core. Hence, adjacent extending portions may be further well overlapped and the height of the coil ends in the axial direction may be further reduced.

Furthermore, at least one portion of the firsthand second extending portions contact adjacent other first and second extending portions. Hence, the height of the coil ends in the axial direction may be reduced.

Also, an outside diameter-side surface of the first extending portions of the stator winding forms an end-side surface as the turn portions and is bent (back) around to form an inner diameter-side surface of a coil of the second extending portions. Thus, since the outer and inner diameter-side surfaces of the winding are twisted to form end-side surfaces as the turn portions, the height of the coil ends in the axial direction may be further reduced.

Furthermore, a cross-section of a coil of the first and second extending portions of the stator winding is thicker in a radial direction than in a circumferential direction. Thus, the winding is thin in the circumferential direction, i.e., the winding direction, and forming the shape of the coil ends in the present invention is thus facilitated.

Moreover, a thickness the coil end in the radial direction is approximately twice that of a radial direction of the wire strands of the first and second extending portions. Hence the stator coil 16 may be realized with the smallest possible diameter.

Further, $2n$ strands of the wire strands are disposed in a row in the depth direction in each of the slots;

and the turn portions of the wire strands are arranged so as to align into n rows in a circumferential direction. Thus, the thickness of the coil ends in the radial direction may be reduced, and the coil ends are not larger than the stator in the radial direction and the size may be reduced, even when the coil ends are lined up in a plurality of circumferential directions.

Moreover, cooling means for supplying cooling ventilation inside the bracket by rotation of the rotor is further provided, the coil ends being cooled by passage of the cooling ventilation inside the bracket Thus, since the size of the coil ends is reduced and there is little copper loss, sufficient cooling air is ventilated at the coil ends, little heat is generated and the reliability of the dynamo-electric machine may be improved.

Also, the cooling ventilation passing through a ventilation passage is ventilated in a radial direction of the coil end. Thus, sufficient cooling air is ventilated at the coil ends.

Moreover, the cooling means is a fan disposed at the rotor and the cooling ventilation is ventilated from an inner diameter-side of the coil ends to an outer diameter-side thereof. Thus, the coil ends may cooled with high cooling efficiency from the inner diameter-side by the centrifugal fan.

What is claimed is:

1. A dynamo-electric machine comprising:

a rotor comprising claw-shaped magnetic poles and fitted to a shaft;

a stator comprising:
 a stator core disposed facing said rotor; and
 a stator winding, a cross-section thereof being a flattened-shape, installed in said stator core;

a bracket supporting said rotor and said stator;

said stator core formed with a number of slots extending axially at a predetermined pitch in a circumferential direction, said stator winding comprising a number of wind portions in which wire strands are wound so as to alternately occupy an inner layer and an outer layer in a slot depth direction within said slots at intervals of a predetermined number of slots, said wire strands folding back outside said slots at axial end surfaces of said stator core to form turn portions, and said turn portions aligning in a circumferential direction to constitute coil end groups, said coil end groups comprising first extending portions extending diagonally from slots of said stator core, end portions formed by said turn portions which are bent and continuous with the first extending portions, and second extending portions continuous with the turn portions and leading to other slots, each said first and second extending portion twisted around a respective extending direction axis and overlapping adjacent other first and second extending portions in a radial direction.

2. The dynamo-electric machine according to claim 1, wherein said end portions formed by said turn portions are inclined relative to a ray extending from a center of the stator core when viewed from an axial direction of the stator.

3. The dynamo-electric machine according to claim 1, wherein each of said end portions formed by said turn portions is inclined relative to an axial direction of the stator.

4. A dynamo-electric machine according to claim 1 wherein,
   said first and second extending portions are twisted as soon as they extend from said stator core.

5. A dynamo-electric machine according to claim 1 wherein,
   at least one portion of said first and second extending portions contact adjacent other first and second extending portions.

6. A dynamo-electric machine according to claim 1 wherein,
   an outside diameter-side surface of said first extending portions of said stator winding forms an end-side surface as said turn portions and is bent around to form an inner diameter-side surface of a coil of said second extending portions.

7. A dynamo-electric machine according to claim 1 wherein,
   a cross-section of a coil of said first and second extending portions of said stator winding is thicker in a radial direction than in a circumferential direction.

8. The dynamo-electric machine according to claim 1 wherein, a thickness of said coil end in a radial direction is approximately twice the thickness in a radial direction of said wire strands of said first and second extending portions.

9. The dynamo-electric machine according to claim 1, wherein
   $2n$ strands of said wire strands are disposed in a row in said depth direction in each of said slots; and
   said turn portions of said wire strands are arranged so as to align into n rows in a circumferential direction.

10. The dynamo-electric machine according to claim 1, further comprising:
    cooling means for supplying cooling ventilation inside said bracket by rotation of said rotor,
    said coil end groups being cooled by passage of said cooling ventilation inside said bracket.

11. A dynamo-electric machine according to claim 10 wherein,
    said cooling ventilation passing through a ventilation passage is ventilated in a radial direction of said coil end groups.

12. The dynamo-electric machine according to claim 11 wherein, said cooling means is a fan disposed on said rotor and said cooling ventilation is ventilated from an inner diameter-side of said coil ends to an outer diameter-side thereof.

* * * * *